Figures 1, 2:
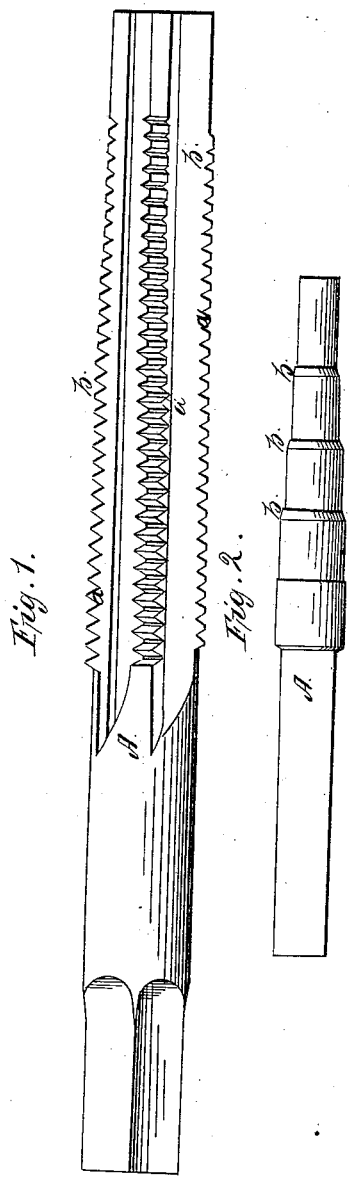

Clark & Farrell,
Screw Tap,
No. 84,411.  Patented Nov. 24, 1868.

Witnesses:
Jno. A. Loring
Edward Griffith

Inventor:
S. J. M. Clark & J. S. Farrell
by their Attorney
Frederick Curtis

SAMUEL J. MILLS CLARK, OF BROOKLINE, AND JOHN L. FARRELL, OF BOSTON, MASSACHUSETTS.

Letters Patent No. 84,411, dated November 24, 1868.

IMPROVED SCREW-TAP.

The Schedule referred to in these Letters Patent and making part of the same.

*To all to whom these presents shall come:*

Be it known that we, SAMUEL J. MILLS CLARK, of Brookline, in the county of Middlesex, and State of Massachusetts, and JOHN L. FARRELL, of Boston, in the county of Suffolk, and State aforesaid, have made an invention of a new and useful Improvement in Taps for Cutting Female Screws; and do hereby declare the following to be a full, clear, and exact description thereof, due reference being had to the accompanying drawings, making part of this specification, and in which—

Figure 1 is a representation of a tap constructed as contemplated by our invention.

Figure 2, being a view of the blank of the tap previous to its teeth being cut thereupon.

This invention has for its object the production of a tap, so constructed as to be able to perform the work for which three distinct taps are now required, that is, in mechanical parlance, the "taper," "plug," and finishing-tap; the first of which consists in cutting away the bulk of the threads, or the interstices between the threads; the second, to reduce such cuts to uniform diameters; and the third, to finish the threads.

Our invention consists in forming the tap of a series of cutting-surfaces or sections, of different diameters, the forward end of each section being tapering for about the length of two of its teeth, in order to readily enter the hole designed to be tapped, each section of the tap cutting a portion only of the entire threads of the screw, the teeth of the taps, from the smaller to the larger end thereof, being gradually brought to a v-shaped edge or point, in order that the last of such teeth shall give the final development and finished shape of the said threads, the whole being as hereinafter explained.

In the drawings before alluded to as illustrating our invention, A denotes a tap, the cutting-teeth of which are shown at *a a a*, &c., the horizontal scores in the body of the tap being shown at *b b b*, and being the same as in the ordinary construction of such tools.

The body of the tap is divided into a plurality of sections, (in the present instance the number of such sections being three,) the teeth of each section being of equal length, or substantially so, with the two forward ones tapering at an angle of about forty-five degrees.

The teeth, beginning at the smaller end of the tap, are frusto-conical in form, and increase gradually in sharpness to the larger end, where they are reduced to a v-shaped outline or sharp edge.

It will be observed, by referring to the accompanying drawings, that the bottoms of the depression or scores between the teeth are cut slightly deeper in the two first sections than in the last or larger one, the object of this being that the teeth of said last section only shall give the perfect finish to the threads of the female screw cut by the tap.

The tapering shape of the commencement of each section of the tap is very advantageous, in that it facilitates the introduction of the next succeeding section, and insures its entering the partially-cut threads of the screw in perfect longitudinal adjustment therewith.

It will of course be understood that the number of graduated sections of the above-described tap may be varied without affecting the character of our invention, the main characteristics of which, as before premised, consist in constructing the body of a tap of a series of teeth, of different length, in order to make gradual and clean cuts of the metal in forming a female screw.

We claim as our invention—

The improved compound tap, made as before described, that is, having its cutting-surface or series of teeth disposed in graduated sections, substantially in the manner and for the purposes shown and specified.

S. J. MILLS CLARK.
J. L. FARRELL.

Witnesses:
FRED. CURTIS,
C. W. BALDWIN,
EDWARD GRIFFITH,
JAS. D. SUMNER.